US011032186B2

(12) United States Patent
Basavaraj et al.

(10) Patent No.: US 11,032,186 B2
(45) Date of Patent: Jun. 8, 2021

(54) FIRST HOP ROUTER IDENTIFICATION IN DISTRIBUTED VIRTUALIZED NETWORKS

(71) Applicant: VMware, Inc., Palo Alto, CA (US)

(72) Inventors: Vijayalaxmi Basavaraj, Santa Clara, CA (US); Ankur Dubey, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 94 days.

(21) Appl. No.: 16/107,747

(22) Filed: Aug. 21, 2018

(65) Prior Publication Data

US 2020/0067819 A1 Feb. 27, 2020

(51) Int. Cl.
H04L 12/761 (2013.01)
H04L 12/751 (2013.01)
H04L 12/18 (2006.01)
H04L 29/12 (2006.01)
G06F 9/455 (2018.01)
H04L 12/46 (2006.01)

(52) U.S. Cl.
CPC .......... H04L 45/16 (2013.01); G06F 9/45558 (2013.01); H04L 12/185 (2013.01); H04L 12/4633 (2013.01); H04L 45/026 (2013.01); H04L 61/2007 (2013.01); G06F 2009/45595 (2013.01)

(58) Field of Classification Search
CPC ... H04L 45/16; H04L 12/4633; H04L 12/185; H04L 45/026; H04L 61/2007; G06F 9/45558; G06F 2009/45595
See application file for complete search history.

(56) References Cited

U.S. PATENT DOCUMENTS

| | | | |
|---|---|---|---|
| 2014/0269707 A1* | 9/2014 | Chandrashekharachar Suvarneshwar | H04L 12/185 370/390 |
| 2016/0182358 A1* | 6/2016 | Peter | H04L 45/16 370/315 |
| 2016/0277199 A1* | 9/2016 | Nagarajan | H04L 12/1863 |
| 2020/0028774 A1* | 1/2020 | Pathikonda | H04L 45/16 |

OTHER PUBLICATIONS

Fenner et al., Protocol Independent Multicast—Sparse Mode (PIM-SM): Protocol Specification (Revised), Network Working Group, Request for Comments: 4601, Aug. 2006. (Year: 2006).*

(Continued)

Primary Examiner — Shailendra Kumar

(57) ABSTRACT

A method for identifying a first hop router ("FHR") in a distributed virtualized network is presented. In an embodiment, a method comprises receiving a multicast message on an incoming interface. In response to receiving the multicast message, the router determines whether the router is a FHR for the multicast message, i.e., whether, in response to generating and transmitting a hello multicast message, the router does not receive a response on the incoming interface; or whether an interface to a RP for the multicast message is different than the incoming interface. If the router is the FHR for the multicast message, then the router determines an IP address of a RP for the multicast message. The router also encapsulates the multicast message into a unicast message, includes in the unicast message the IP address of the RP as a destination address, and transmits the unicast message to the RP.

20 Claims, 5 Drawing Sheets

(56) References Cited

OTHER PUBLICATIONS

Semeria et al., "Introduction to IP Multicast Routing", dated 1996, 35 pages.
Network Watcher Documentation, What Is Azure Network Watcher?, dated May 30, 2017, 271 pages.
HP, "HP Virtual Machine Management Pack (VMM) 3.5 Does Not Support Failed Host Recovery (FHR) on HP Integrated VMware ESX Server 3i and HP Integrated Citrix XenServer Hosts", Jun. 20, 2008, 2 pages.
Cisco, "Rendezvous Point Engineering", https://www.cisco.com/c/en/us/products/collateral/ios-nx-os-software/ip/index.html, last updated Aug. 20, 2009, 5 pages.
Baker et al., "First-Hop Router Selection by Hosts in a Multi-Prefix Network", Internet Engineering Task Force, dated Nov. 2016, 13 pages.

* cited by examiner

FIRST HOP ROUTER IDENTIFICATION IN DISTRIBUTED VIRTUALIZED NETWORKS

BACKGROUND

In traditional multicast networks, multicast routers are directly connected to the hosts that are sources of multicast traffic. A multicast router that is directly connected to a source host or a virtual machine ("VM") originating multicast traffic is referred to as a first hop router ("FHR") for the multicasts.

In a distributed virtualized network, however, a source of multicast traffic may be implemented in a L3 subnet that is different than a subnet in which a FHR for the multicasts is implemented. Therefore, a control plane executing on the FHR may be unable to identify itself as a FHR. Thus, multicast traffic, including multicast traffic communicated in compliance with the Protocol Independent Multicast ("PIM"), may be dropped.

The situation may be even more complicated in software-defined virtualization networks in which a forwarding information base ("FIB") is calculated for a distributed router by a separate control VM, and some services run on separate nodes including edge services gateways ("ESGs"). An ESG in such networks needs to be able to identify itself as a FHR for multicast messages to avoid dropping the multicast traffic.

SUMMARY

In an embodiment, techniques are presented for identification of a first hop router in a distributed virtualized network. The techniques are applicable to multicasting, and in particular to multicasting communicated in compliance with the PIM in a sparse mode ("SM"). Therefore, the techniques are referred to as the first hop router identification in PIM-SM networks.

A L3 logical router, also referred to as a logical router, implemented in a distributed virtualization network may determine whether the router is a first hop router for a multicast message using any of two approaches: according to a first approach, upon receiving a multicast message on an incoming interface, a logical router generates and transmits a L3 hello message, and analyzes L3 responses received to the hello message. The hello-massage-based approach is described in FIG. 2-3.

If no L3 response to the L3 hello message is received on the incoming interface on which the logical router received the multicast message, then the router concludes that it is a first hop router for the multicast message. By checking whether any L3 response is received on the same incoming interface on which the logical router received the multicast message, the router tests whether there is another L3-enabled router on a path between a sender of the multicast message and the logical router. If the logical router determines that there is no other L3-enabled router on that path, then the logical router determines that it is a first hop router for the multicast message. However, if the logical router receives a L3 response to the L3 hello message on the incoming interface on which the multicast message was received, then the router determines that there is some other L3-enabled router that is implemented on the path and that is a first hop router for the multicast message.

According to a second approach, upon receiving a multicast message on an incoming interface, a logical router implemented in a distributed virtualization network parses the multicast message and analyzes the parsed multicast message and a multicast forwarding information base ("MFIB") stored for the router. The MFIB-based approach is described in FIG. 4-5.

If the router's MFIB includes an entry for a multicast group to which the received multicast message belongs, and if an interface to a rendezvous point for handling the multicast message is different than the incoming interface, then the router concludes that the router is a first hop router for the multicast message. This is because if the interface from which the logical router should transmit multicasts to the rendezvous point for the multicast group is different than the incoming interface on which the logical router received the multicast message, then the logical router has been already programmed with information about how and to whom the router should forward the multicasts. Thus, the logical router is a first hop router for the multicast message.

DETAILED DESCRIPTION

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach.

1. EXAMPLE PHYSICAL IMPLEMENTATIONS

Figure 1:
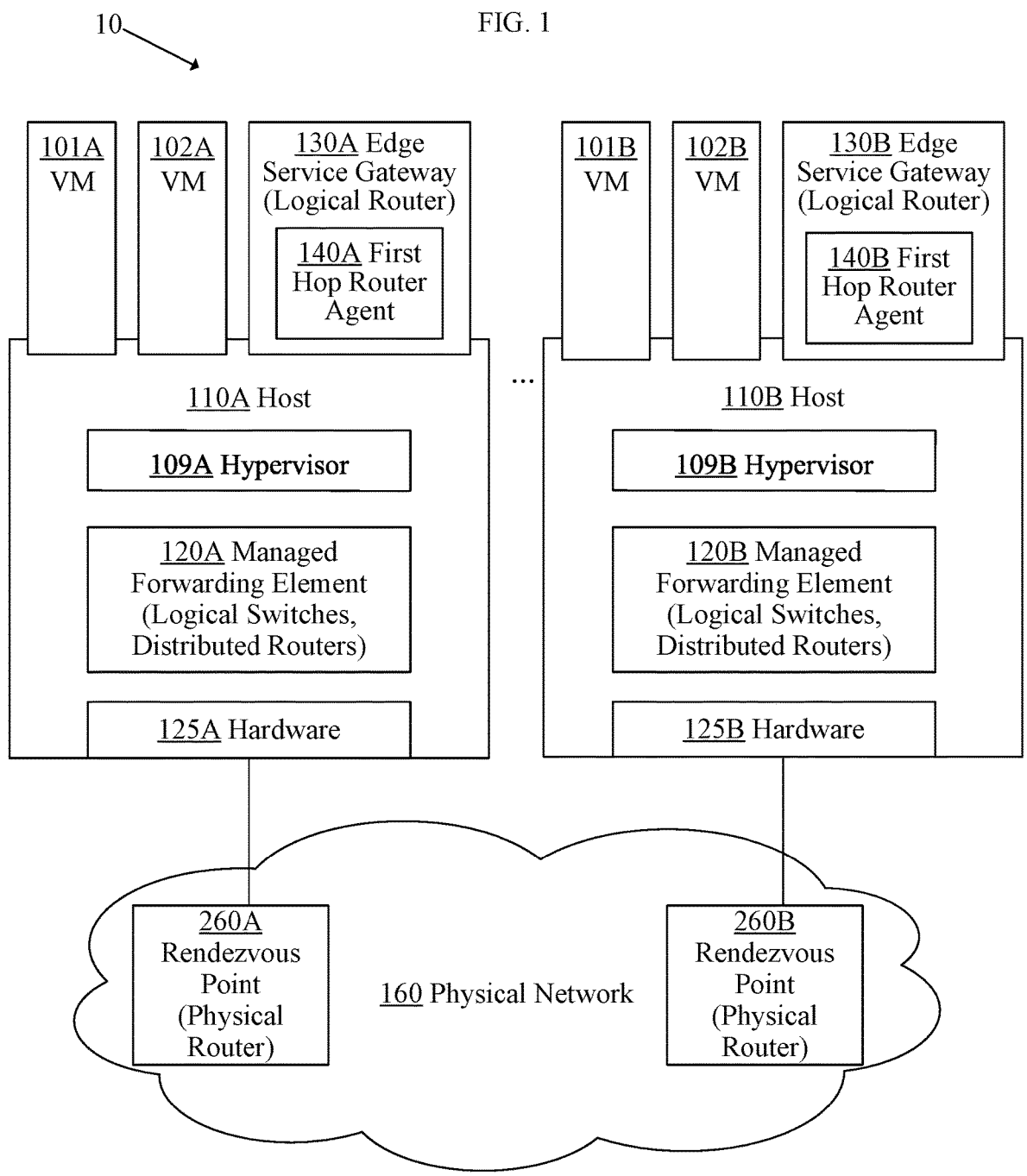
FIG. 1 is a block diagram depicting an example physical implementation view of an example logical network environment for implementing a first hop router identification in a distributed virtualized network.

FIG. 1 is a block diagram depicting an example physical implementation view of an example logical network environment for identifying a first hop router in a distributed virtualization network. In the depicted example, environment 10 includes one or more hosts 110A and 110B, and one or more physical networks 160. Environment 10 may include additional hosts and additional networks not depicted in FIG. 1.

Hosts 110A-110B may be configured to implement VMs, edge service gateways, logical routers, logical switches, and the like. Hosts 110A-110B are also referred to as computing devices, host computers, host devices, physical servers, server systems, or physical machines.

In the example depicted in FIG. 1, host 110A is configured to support VMs 101A-102A and an edge service gateway 130A; while host 110B is configured to support VMs 101B-

102B and an edge service gateway 130B. The hosts may support additional VMs and additional gateways not depicted in FIG. 1.

Virtual machines 101A-102A and 101B-102B executed on hosts 110A-110B, respectively, are examples of virtualized computing instances or workloads. A virtualized computing instance may represent an addressable data compute node or an isolated user space instance.

Edge service gateways 130A-130B are virtualized network components that may be configured to provide edge security and gateway services to virtual machines and hosts. They may be implemented as logical routers or as service gateways, and may provide dynamic routing services, firewall services, NAT services, DHCP services, site-to-site VPN services, L2 VPN services, load balancing services, and the like.

In an embodiment, edge service gateways 130A-130B include first hop router agents 140A, 140B, respectively. First hop router agents 140A-140B are configured to perform a first hop router identification in virtualized network environment 10. First hop router agents 140A-140B are usually implemented in software. They are described in detail in the following sections.

Edge service gateways 130A-130B may implement gateways configured to process and forward data traffic to and from VMs and hosts. Edge service gateways 130A-130B may also implement one or more service routers configured to provide various services to VMs 101A-102A and 101B-102B. Each service router may be configured with one or more ports, and each port may have assigned its own IP address for addressing the services that the router provides.

In an embodiment, hosts 110A-110B are configured to support execution of hypervisors 109A-109B and execution of managed forwarding elements 120A-120B, respectively. Hypervisors 109A-109B are software layers or components that support the execution of VMs 101A-102A and 101B-102B. Hypervisors 109A-109B may be configured to implement virtual switches and forwarding tables that facilitate data traffic between the virtual machines. In certain embodiments, virtual switches and other hypervisor components may reside in a privileged virtual machine, sometimes referred to as a "Domain Zero" or a "root partition" (not shown). Hypervisors 109A-109B may also maintain mappings between underlying hardware 125A-125B and virtual resources allocated to the respective VMs.

Managed forwarding elements 120A-120B may be configured to perform forwarding of packets communicated to and from VMs and/or edge service gateways. For example, if managing forwarding element 120A executing on host 110A receives a packet from VM 101A, then managing forwarding element 120A may perform the processing for a logical switch, and logical routing to direct the packet to edge service gateway 130A. Managed forwarding elements 120A and 120B may collectively implement one or more logical switches and logical routers, which are accordingly "distributed" across multiple hosts. Although only one managed forwarding element is shown in each hypervisor, it should be noted that any number may be so instantiated.

Each of hosts 110A-110B includes one or more hardware components 125A-125B, respectively. Each of hardware components 125A-125B may include one or more processors, one or more memory units, one or more physical network interface cards, and one or more storage devices.

Hosts 110A-110B may communicate with rendezvous points 260A-260B.

A rendezvous point in a multicast network domain is usually a physical router that acts as a shared root for a multicast shared tree. The rendezvous point is usually configured to register messages from designated routers that received requests to join a group. The rendezvous point is also configured to generate and transmit join/prune messages and communicate multicast messages between members of a multicast group. In the depicted example, rendezvous points 260A-260B are components of a physical network 160.

2. FIRST HOP ROUTER IDENTIFICATION IN A DISTRIBUTED VIRTUALIZATION NETWORK

A logical router implemented in a distributed virtualization network may determine whether the router is a first hop router for a received multicast message using any of two approaches. A first approach is referred to as a hello-message-based approach and is described in FIG. 2-3. A second approach is referred to as a MFIB-based approach and is described in FIG. 4-5.

3. EXAMPLE PROCESS FOR USING HELLO MESSAGES TO IDENTIFY A FIRST HOP ROUTER

Figure 2:
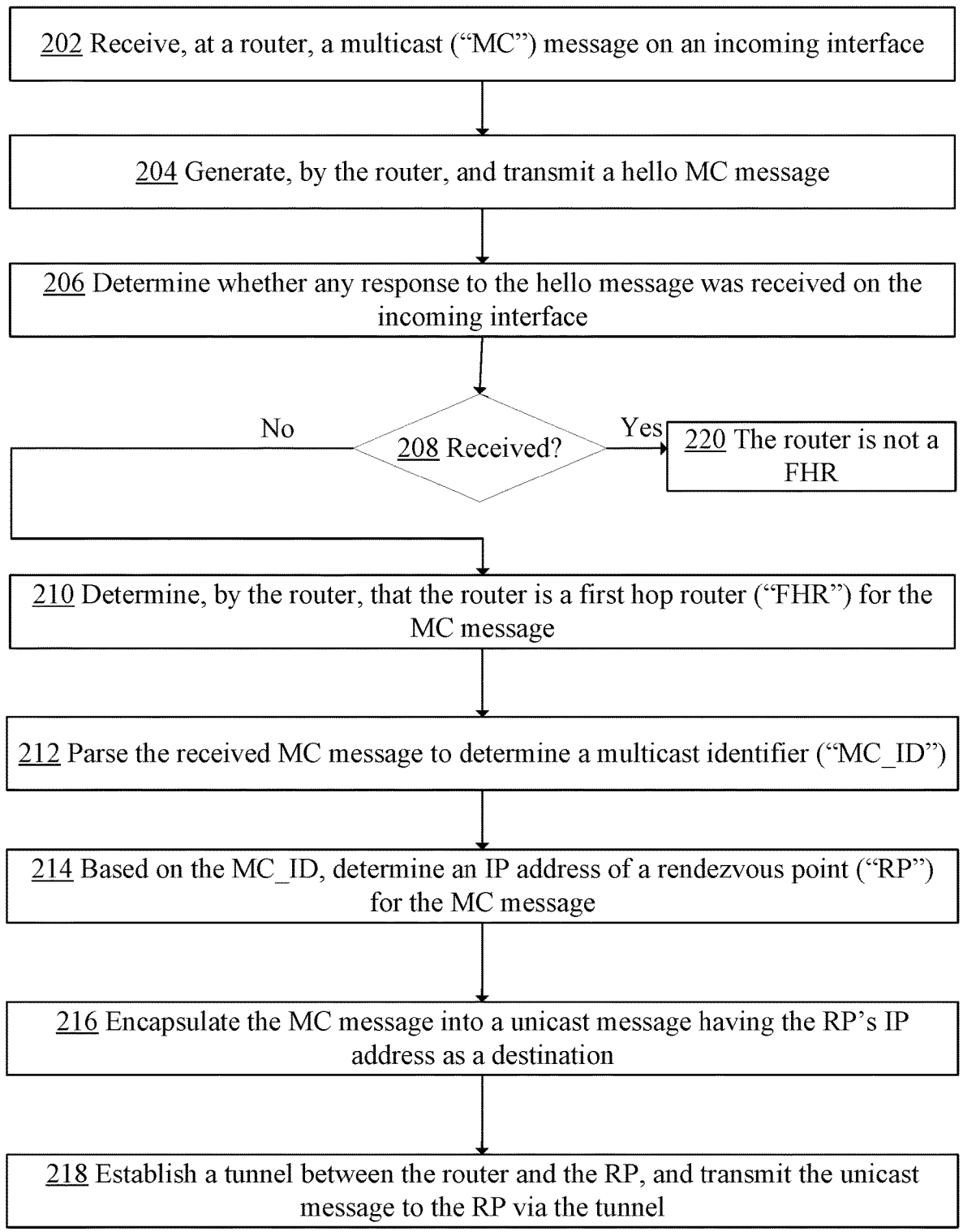
FIG. 2 is a flow chart for implementing a first hop router identification in a distributed virtualized network based on hello messages.

FIG. 2 is a flow chart for implementing a first hop router identification in a distributed virtualized network based on hello messages. The process described in FIG. 2 is executed by a first hop router agent implemented in a L3 logical router of a host in a distributed virtualization network. For example, the process may be executed by first hop router agent 140A implemented in edge service gateway 130A of host 110A, depicted in FIG. 1. If the distributed virtualization network includes a plurality of hosts, and each host implements one or more logical routers, then the process described in FIG. 2 may be executed by the first hop router agents of the logical routers implemented in the hosts.

In step 202, a first hop router agent of a logical router receives a multicast message on an incoming interface of the logical router. The multicast message may be received from a virtual machine. For example, the multicast message may be received from VM 101A by first hop router agent 140A, depicted in FIG. 1.

In step 204, the first hop router agent generates a L3 hello multicast message and transmits the hello multicast message from the router's interfaces. The hello message may be any type of a L3 multicast hello message, including a PIM message.

Upon receiving the L3 hello message from the logical router, only L3-enabled nodes may parse the L3 hello message, generate a L3-response to the L3 hello message, and respond with the L3-response. However, the nodes that are not configured with L3-protocols, are unable to parse the received L3 hello message, and thus are unable to respond to the L3 hello message.

In step 206, the first hop router agent determines whether any response to the hello message has been received on the same incoming interface on which the logical router received the multicast message. The first hop router agent may use a timer to determine a wait period for receiving the hello messages. The first hop router agent may set the timer when the L3 hello message is transmitted from the logical router, and the timer may be set to a certain time period that has been shown empirically as sufficient for awaiting a response to a hello message.

If the logical router receives a L3 response to the L3 hello message on the incoming interface on which the logical router received the multicast message, then the logical router may determine that some other router, implemented between a sender of the multicast message and the logical router that executes this process, is a L3-enabled router and thus is a first hop router for the multicast message.

However, if the first hop router agent determines that no response to the L3 hello message is received on the same incoming interface on which the multicast message was received, then the logical router that executes this process may determine that it is a first hop router for the multicast message because no other L3-enabled router is implemented between the logical router and the sender of the multicast message.

If, in step 208, the first hop router agent determines that no response to the hello message has been received on the same incoming interface on which the logical router received the multicast message, then the first hop router agent proceeds to performing step 210; otherwise, the first hop router agent may forward the multicast message to other switches and routers.

In step 210, the first hop router agent determines that the logical router on which the first hop router agent is being executed is a first hop router for the multicast message. The logical router is the first hop router for the multicast message because no response to the L3 hello message was received on the same interface on which the logical router received the multicast message, and therefore, no L3-enabled logical router is implemented between the sender of the multicast message and the logical router that is executing this process.

In step 212, the first hop router agent parses the multicast message, and extracts a multicast identifier ("MC_ID") from the multicast message.

In step 214, the first hop router agent uses the MC_ID to access a MFIB stored for the logical router, and to retrieve a data record for the MC_ID. Then, the first hop router agent parses the retrieved record to identify an IP address of a rendezvous point for the multicasts communicated for a multicast group identified by the MC_ID. The rendezvous point may be rendezvous point 260A, which is a component of a physical network 160, as described in FIG. 1.

In step 216, the first hop router agent encapsulates the multicast message into a unicast message and includes the IP address of the rendezvous point as a destination IP address of the unicast.

In step 218, the logical router on which the first hop router agent is executed establishes a tunnel between the router and the rendezvous point. Once the tunnel is established, the logical router transmits, via the tunnel, the unicast message to the rendezvous point. The unicast message includes the encapsulated multicast message.

Upon receiving the unicast message, the rendezvous point decapsulates the unicast messages, and extracts and processes the multicast message. The multicast message may be, for example, a request to join a group, a request to leave a group, or an actual multicast posting.

To communicate subsequent multicast messages from the same sender, the logical router may reuse the established tunnel and the IP address of the rendezvous point that is configured to handle the multicast messages for that multicast group.

4. EXAMPLE FIRST HOP ROUTER IDENTIFICATION BASED ON HELLO MESSAGES

Figure 3:
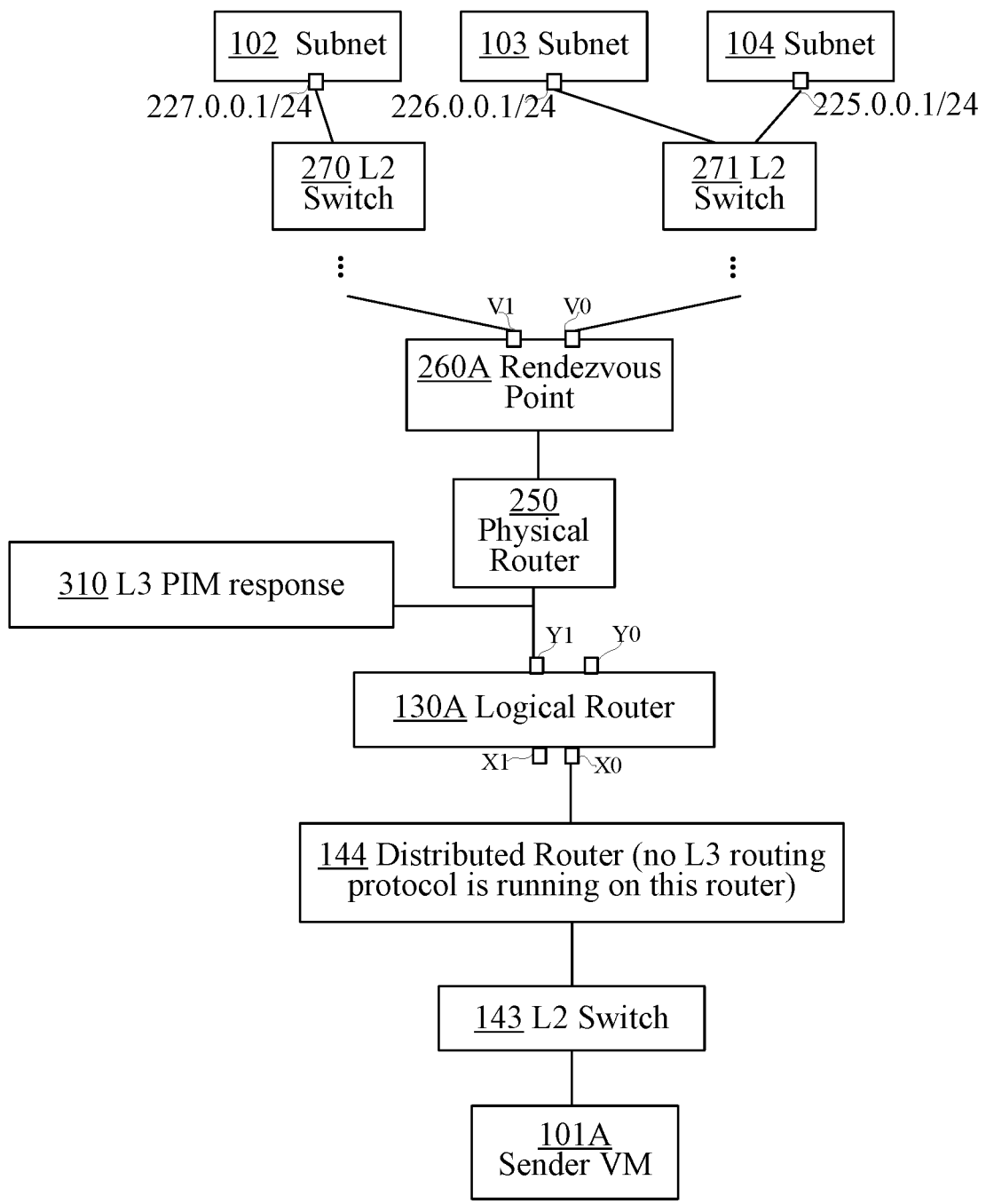
FIG. 3 is a block diagram depicting an example implementation of a first hop router identification in a distributed virtualized network based on hello messages.

FIG. 3 is a block diagram depicting an example implementation of a first hop router identification in a distributed virtualized network based on hello messages. The example is described in reference to elements introduced in FIG. 1.

Suppose that VM 101A sends a multicast message to a multicast group for which a rendezvous point 260A acts as a shared root of a multicast shared tree. Suppose that the multicast message is communicated via one or more L2 switches 143 and one or more distributed logical routers 144 before it reaches L3 logical router 130A, which corresponds to edge service gateway 130A in FIG. 1. Furthermore, suppose that logical router 130A receives the multicast message on an incoming interface x0. Moreover, suppose that logical router 130A is configured to execute the first hop router identification process described in FIG. 2.

As described in FIG. 2, to determine whether logical router 130A is a first hop router for the received multicast message, logical router 130A generates a L3 hello message and transmit the L3 hello message from its interfaces, such as interfaces x0, x1, y0, and y1, depicted in FIG. 3. Logical router 130A does so to determine whether there are any L3-enabled, PIM-configured neighbors "south" of logical router 130A. If there is a PIM-configured router implemented "south" of logical router 130A, then logical router 130A cannot be a first hop router for the received multicast message.

After transmitting the L3 hello message and waiting a certain period of time, logical router 130A checks whether logical router 130A received a L3 response to the L3 hello message on the incoming interface x0. If it has, then logical router 130A has a PIM-configured neighbor south of logical router 130A. However, if logical router 130A receives a L3 PMI response 310 on an interface other than the incoming interface, then logical router 130A is a first hop router for the multicast message because it is a first PIM-configured router on the path traversed by the multicast message from sender VM 101A to logical router 130A.

If logical router 130A determines that it is a first hop router for the multicast message, then logical router 130A determines an IP address of rendezvous point 260, establishes a tunnel with rendezvous point 260, generates a unicast message with the IP address of rendezvous point 260 as a destination, encapsulates the multicast message into the unicast message, and transmit the unicast message to rendezvous point 260A. The message may be forwarded by one or more physical routers 250, and/or other switches and routers, before it reaches rendezvous point 260A.

Upon receiving the unicast message, rendezvous point 260A parses the unicast message, and processes the multicast message encapsulated in the unicast message. In the depicted example, if the multicast message is an actual multicast post to, for example, subnet 104 having an address 225.0.0.1/24, then rendezvous point 260A transmits the message via one or more switches 271, and/or one or more routers (not depicted in FIG. 3) to subnet 104. If the multicast message is intended to a subnet 103 or a subnet 102, then rendezvous point 260A transmits the message via one or more switches 271 or one or more switches 270.

5. EXAMPLE PROCESS FOR USING MFIB DATA TO IDENTIFY A FIRST HOP ROUTER

Figure 4:
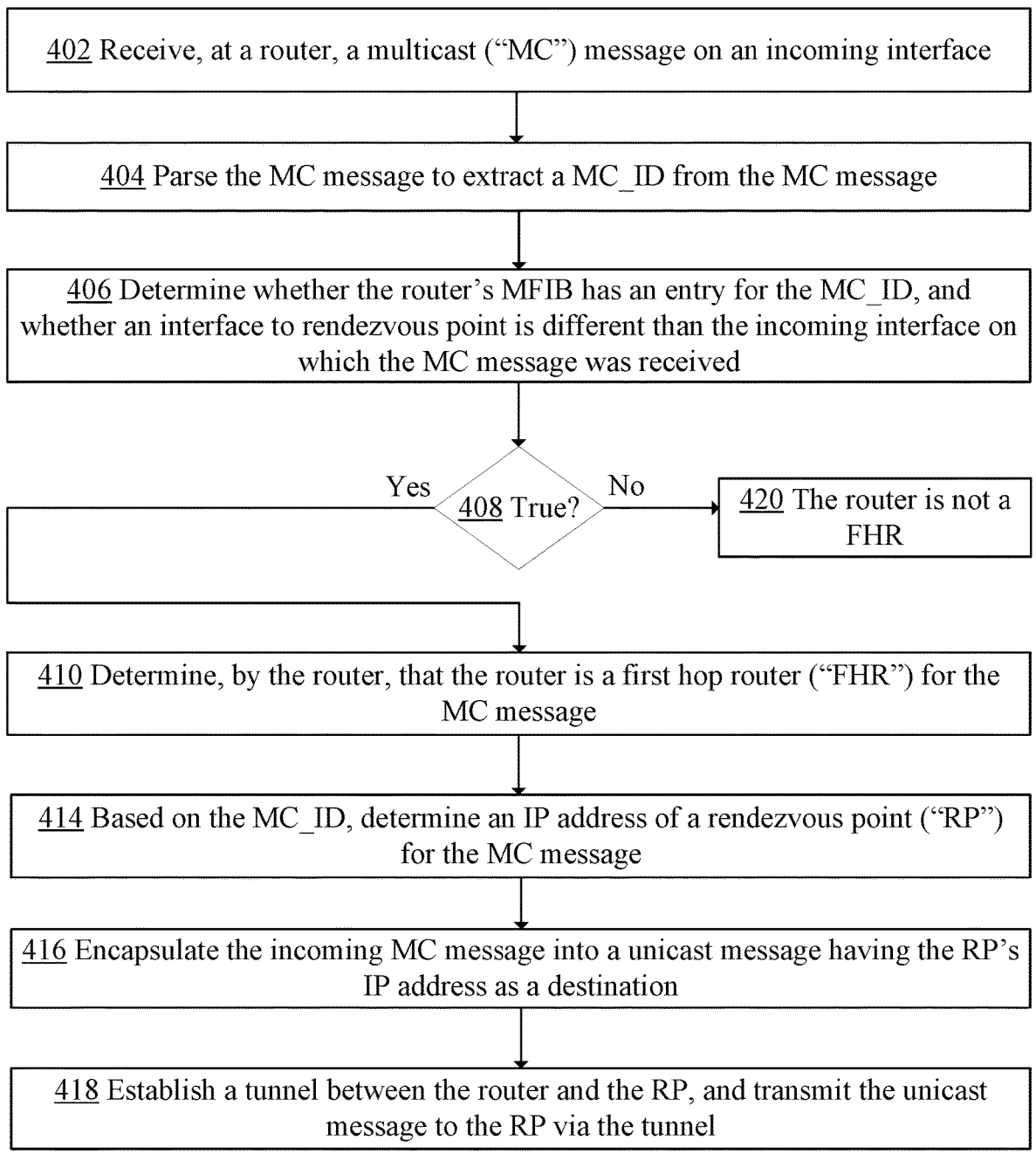
FIG. 4 is a flow chart for implementing a first hop router identification in a distributed virtualized network based on MFIB data.

FIG. 4 is a flow chart for implementing a first hop router identification in a distributed virtualized network based on MFIB data. The process described in FIG. 4 is executed by a first hop router agent implemented in a L3 logical router of a host in a distributed virtualization network. For example, the process may be executed by first hop router agent 140A implemented in edge service gateway 130A of host 110A, depicted in FIG. 1. If the distributed virtualization network includes a plurality of hosts, and each host implements one or more logical routers, then the process described in FIG. 4 may be executed by the first hop router agents of the logical routers implemented in the hosts.

In step 402, a first hop router agent of a logical router receives a multicast message on an incoming interface of the logical router. The multicast message may be received from a virtual machine. For example, the multicast message may be received from VM 101A by first hop router agent 140A, depicted in FIG. 1.

In step 404, the first hop router agent parses the received multicast message to extract a MC_ID from the message.

In step 406, the first hop router agent determines whether the logical router's MFIB includes an entry for the MC_ID extracted from the multicast message. If the MFIB includes the record for the MC_ID, then the record will also include an identifier of an interface from which the logical router should transmit messages to a rendezvous point dedicated to multicasts for a group identified by the MC_ID. If the MFIB includes the record for the MC_ID and the interface identifier, then the first hop router agent tests whether the interface identifier corresponds to an interface other than the incoming interface on which the logical router received the multicast message. If the interfaces are different, then the logical router is a first hop router for the received message because the logical router has been programmed with the information about how and to whom it should forward the multicasts for the group identified by the MC_ID.

However, if the MFIB of the logical router does not include a record for the MC_ID, then the logical router has not been provided with information about the rendezvous point for the multicasts for the group identified by the MC_ID, and thus it is not a first hop router.

Furthermore, the logical router is not a first hop router when even though the MFIB of the logical router has a record identified by the MC_ID, the interface from which the logical router should transmit the multicast message to a rendezvous point for a group identified by the MC_ID is the same as the incoming interface on which the logical router received the multicast message. Some other L3-enabled router, implemented between the sender of the multicast message and the logical router that executes this process, is a L3-enabled router and thus a first hop router for the multicast message.

If, in step 408, the first hop router agent determines that the MFIB includes the record for the MC_ID, and the interface from which the logical router should transmit multicasts to the rendezvous point is different than the incoming interface on which the logical router received the multicast message, then the first hop router agent determines that the logical router is a first hop router for this multicast message; and the first hop router agent proceeds to executing step 410. Otherwise, the first hop router agent may forward the multicast message to other switches and routers.

In step 410, the logical router determines that it is a first hop router for the multicast message.

Steps 414-418 in FIG. 4 correspond to steps 214-218, respectively, of FIG. 1. Hence, in step 414, the first hop router agent determines an IP address of a rendezvous point for the multicasts for a multicast group identified by the MC_ID; in step 416, the first hop router agent encapsulates the multicast message into a unicast message, and includes the IP address of the rendezvous point as a destination IP address of the unicast; and in step 418, the logical router on which the first hop router agent is executed establishes a tunnel between the router and the rendezvous point, and transmits, via the tunnel, the unicast message to the rendezvous point.

Upon receiving the unicast message, the rendezvous point decapsulates the unicast messages, and extracts and processes the multicast messages. The multicast message may be, for example, a request to join a group, a request to leave a group, or an actual multicast posting.

To communicate subsequent multicast messages from the same sender, the logical router may reuse the established tunnel and the IP address of the rendezvous point that is configured to handle multicast messages of that particular multicast group.

6. EXAMPLE FIRST HOP ROUTER IDENTIFICATION BASED ON MFIB DATA

Figure 5:
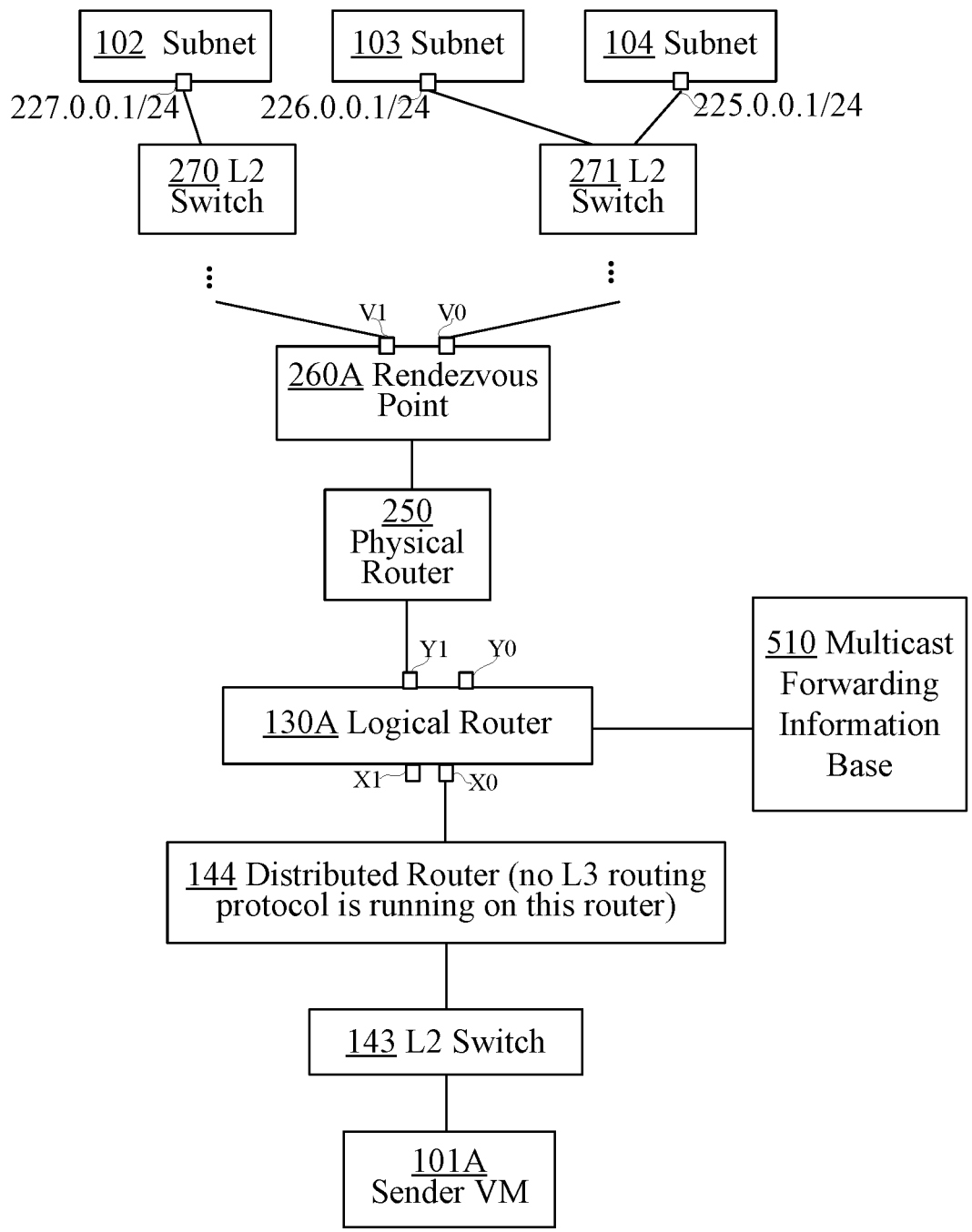
FIG. 5 is a block diagram depicting an example implementation of a first hop router identification in a distributed virtualized network based on MFIB data.

FIG. 5 is a block diagram depicting an example implementation of a first hop router identification in a distributed virtualized network based on MFIB data. The example is described in reference to elements introduced in FIG. 1.

Suppose that VM 101A sends a multicast message to a multicast group for which a rendezvous point 260A acts as a shared root for a multicast shared tree. Suppose that the multicast message is communicated via one or more L2 switches 143 and one or more distributed routers 144 before it reaches L3 logical router 130A, which corresponds to edge service gateway 130A in FIG. 1. Furthermore, suppose that logical router 130A receives the multicast message on an incoming interface x0. Moreover, suppose that logical router 130A is configured to execute the first hop router identification process described in FIG. 4.

As described in FIG. 4, to determine whether logical router 130A is a first hop router for the received multicast message, logical router 130A parses the multicast message, extracts a MC_ID from the message, and uses the MC_ID to determine if a MFIB 510 stored for the logical router includes a record indexed using the MC_ID. If MFIB 510 includes such a record, then the logical router 130A tests, based on the content of the record, whether an interface from which logical router 130A should transmit multicasts toward a rendezvous point for a group identified by the MC_ID is different than the incoming interface on which logical router 130A received the multicast message. If both conditions are met, then logical router 130A is a first hop router for the received multicast message. Otherwise, some other L3-enabled router is a first hop router for the received multicast message.

If logical router 130A determines that it is a first hop router for the multicast message, then logical router 130A determines an IP address of rendezvous point 260, establishes a tunnel with rendezvous point 260, generates a unicast message with the IP address of rendezvous point 260 as a destination, encapsulates the multicast message into the unicast message, and transmits the unicast message to rendezvous point 260A. The message may be forwarded by one or more physical routers 250, and/or other switches and routers, before it reaches rendezvous point 260A.

Upon receiving the unicast message, rendezvous point 260A parses the unicast message, and processes the multicast message encapsulated in the unicast message. If the multicast message is an actual multicast post to, for example, subnet 104A having an address 225.0.0.1/24, then rendezvous point 260A transmits the message to subnet 104A. Before it reaches subnet 104A, the message may be forwarded by one or more switches 271, and one or more routers.

7. IMPROVEMENTS PROVIDED BY CERTAIN EMBODIMENTS

In an embodiment, an approach provides mechanisms for a L3 logical router in a distributed virtualized network to quickly and efficiently determine whether the logical router is a first hop router for a multicast message received by the router. The approach allows the logical router to determine whether it is a first hop router by either analyzing responses received by the router to a L3 hello message or analyzing contents of a MFIB of the router.

In an embodiment, an approach improves over the traditional PIM-SM approaches because it spares the nodes from generating and transmitting massive traffic in a distributed virtualized network to determine whether the router is a first hop router for a received multicast message.

In an embodiment, an approach is widely applicable to software-defined networks in which a FIB for a router is calculated by a separate control VM, and some services run on separate nodes, including edge services gateways.

8. IMPLEMENTATION MECHANISMS

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus and used for storing information and software instructions to be executed by a processor. Main memory may also be used for storing temporary variables or other intermediate information during execution of software instructions to be executed by one or more processors.

9. GENERAL CONSIDERATIONS

Although some of various drawings may illustrate several logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

Any definitions set forth herein for terms contained in the claims may govern the meaning of such terms as used in the claims. No limitation, element, property, feature, advantage, or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," indicate that the embodiment described or illustrated may include a feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A method comprising:
   receiving, by a router, a multicast message on an incoming interface;
   in response to receiving the multicast message:
   generating and transmitting a hello multicast message;
   determining whether any response to the hello multicast message has been received on the incoming interface; and
   in response to determining that no response to the hello multicast message has been received on the incoming interface, determining, by the router, the router is a first hop router for the multicast message;
   in response to determining that the router is the first hop router for the multicast message:
   determining, by the router, an IP address of a rendezvous point for the multicast message;
   encapsulating the multicast message into a unicast message and including, in the unicast message, the IP address of the rendezvous point as a destination address; and
   transmitting the unicast message to the rendezvous point.

2. The method of claim 1, wherein the hello multicast message is a L3 multicast message.

3. The method of claim 1, wherein the router is a L3 logical router.

4. The method of claim 1, wherein the unicast message is transmitted to the rendezvous point via a communications tunnel established between the router and the rendezvous point;
   wherein the router is a L3 protocol independent multicast ("PIM") configured router; and
   wherein the rendezvous point is a L3 router.

5. One or more non-transitory computer-readable storage media storing one or more computer instructions which, when executed by one or more processors, cause the one or more processors to perform:
   receiving, by a router, a multicast message on an incoming interface;
   in response to receiving the multicast message:
      generating and transmitting a hello multicast message;
      determining whether any response to the hello multicast message has been received on the incoming interface; and
   in response to determining that no response to the hello multicast message has been received on the incoming interface, determining, by the router, the router is a first hop router for the multicast message;
   in response to determining that the router is the first hop router for the multicast message:
      determining, by the router, an IP address of a rendezvous point for the multicast message;
      encapsulating the multicast message into a unicast message and including, in the unicast message, the IP address of the rendezvous point as a destination address; and
      transmitting the unicast message to the rendezvous point.

6. The one or more non-transitory computer-readable storage media of claim 5, wherein the hello multicast message is a L3 multicast message.

7. The one or more non-transitory computer-readable storage media of claim 5, wherein the router is a L3 logical router.

8. The one or more non-transitory computer-readable storage media of claim 5, wherein the unicast message is transmitted to the rendezvous point via a communications tunnel established between the router and the rendezvous point;
   wherein the router is a L3 protocol independent multicast ("PIM") configured router; and
   wherein the rendezvous point is a L3 router.

9. A system comprising:
   one or more processors;
   one or more memory units; and
   one or more non-transitory computer-readable storage media storing one or more computer instructions which, when executed by the one or more processors, cause the one or more processors to perform:
   receiving, by a router, a multicast message on an incoming interface;
   in response to receiving the multicast message:
      generating and transmitting a hello multicast message;
      determining whether any response to the hello multicast message has been received on the incoming interface; and
   in response to determining that no response to the hello multicast message has been received on the incoming interface, determining, by the router, the router is a first hop router for the multicast message;
   in response to determining that the router is the first hop router for the multicast message:
      determining, by the router, an IP address of a rendezvous point for the multicast message;
      encapsulating the multicast message into a unicast message and including, in the unicast message, the IP address of the rendezvous point as a destination address; and
      transmitting the unicast message to the rendezvous point.

10. The system of claim 9, wherein the hello multicast message is a L3 multicast message.

11. The system of claim 9, wherein the router is a L3 logical router.

12. A method comprising:
   receiving, by a router, a multicast message on an incoming interface;
   in response to receiving the multicast message:
      parsing, by the router, the multicast message to extract an identifier of the multicast message;
      determining, by the router, whether a multicast forwarding information base of the router includes an information base entry for the identifier extracted from the multicast message;
      in response to determining that the multicast forwarding information base of the router includes an information base entry for the identifier extracted from the multicast message:
         determining, by the router, whether an interface to the rendezvous point for the multicast message is different than the incoming interface; and
         in response to determining that an interface to the rendezvous point for the multicast message is different than the incoming interface, determining, by the router, the router is a first hop router for the multicast message;
   in response to determining that the router is the first hop router for the multicast message:
      determining, by the router, an IP address of a rendezvous point for the multicast message;
      encapsulating the multicast message into a unicast message and including, in the unicast message, the IP address of the rendezvous point as a destination address; and
      transmitting the unicast message to the rendezvous point.

13. The method of claim 12, wherein determining an IP address of a rendezvous point for the multicast message includes extracting, from the multicast forwarding information base, the IP address of the rendezvous point based on the identifier of the multicast message.

14. The method of claim 12, wherein the router is a L3 logical router.

15. The method of claim 12, wherein the unicast message is transmitted to the rendezvous point via a communications tunnel established between the router and the rendezvous point;
   wherein the router is a L3 protocol independent multicast ("PIM") configured router; and
   wherein the rendezvous point is a L3 router.

16. One or more non-transitory computer-readable storage media storing one or more computer instructions which, when executed by one or more processors, cause the one or more processors to perform:
   receiving, by a router, a multicast message on an incoming interface;
   in response to receiving the multicast message:
      parsing, by the router, the multicast message to extract an identifier of the multicast message;
      determining, by the router, whether a multicast forwarding information base of the router includes an information base entry for the identifier extracted from the multicast message;

in response to determining that the multicast forwarding information base of the router includes an information base entry for the identifier extracted from the multicast message:
   determining, by the router, whether an interface to the rendezvous point for the multicast message is different than the incoming interface; and
in response to determining that an interface to the rendezvous point for the multicast message is different than the incoming interface, determining, by the router, the router is a first hop router for the multicast message;
in response to determining that the router is the first hop router for the multicast message:
   determining, by the router, an IP address of a rendezvous point for the multicast message;
   encapsulating the multicast message into a unicast message and including, in the unicast message, the IP address of the rendezvous point as a destination address; and
transmitting the unicast message to the rendezvous point.

17. The one or more non-transitory computer-readable storage media of claim 16, comprising additional instructions which, when executed by the one or more processors, cause the one or more processors to perform:
   extracting, from the multicast forwarding information base, the IP address of the rendezvous point based on the identifier of the multicast message.

18. The one or more non-transitory computer-readable storage media of claim 16, wherein the router is a L3 logical router.

19. The one or more non-transitory computer-readable storage media of claim 16, wherein the unicast message is transmitted to the rendezvous point via a communications tunnel established between the router and the rendezvous point;
   wherein the router is a L3 protocol independent multicast ("PIM") configured router; and
   wherein the rendezvous point is a L3 router.

20. The one or more non-transitory computer-readable storage media of claim 16, wherein the multicast message is a request to join a group, a request to leave a group, or a multicast posting.

* * * * *